R. DUTTON
Differential Gearing.

No. 211,894.  Patented Feb. 4, 1879.

Witnesses:

Inventor:
Rufus Dutton

UNITED STATES PATENT OFFICE.

RUFUS DUTTON, OF YONKERS, NEW YORK.

IMPROVEMENT IN DIFFERENTIAL GEARING.

Specification forming part of Letters Patent No. 211,894, dated February 4, 1879; application filed April 5, 1878.

*To all whom it may concern:*

Be it known that I, RUFUS DUTTON, of the city of Yonkers, in the county of Westchester and State of New York, have invented a new and useful Improvement in Differential Gearing, of which the following is a specification:

My invention relates to an improvement in differential gearing in which bevel-gears are used. Heretofore the only practicable application to machinery of differential bevel-gears, so far as I am aware, has been where one of the gears oscillated upon a gimbal-joint; but the gimbal-joint, not being a true universal joint, allows a free oscillation only within narrow limits, and is for that reason not adapted to general use. It is also objectionable because the joints of the gimbal are very liable to become worn, thus destroying the smooth working of the gears and causing them to run irregularly.

The object of my invention is to provide a system of differential bevel-gearing under such a form as will make it practicable and preferable to common gears for transmitting power or motion, especially where a great increase or decrease of speed is required.

My invention consists of two sets of bevel-gears, forming three different parts—first, an oscillating disk having on one of its faces two gears; second, a rotating gear with a different number of teeth from its corresponding gear on the disk; third, a stationary gear exactly like its corresponding gear on the oscillating disk. This last gear has for its object only to prevent the oscillating disk from turning with the rotating gear. On the three depend the motion.

It also consists, in this case, in the use of a ball-and-socket joint having an adjustable stem; and it finally consists in a casing which incloses and protects the gearing, and also forms a component part of the mechanism.

Figure 1:
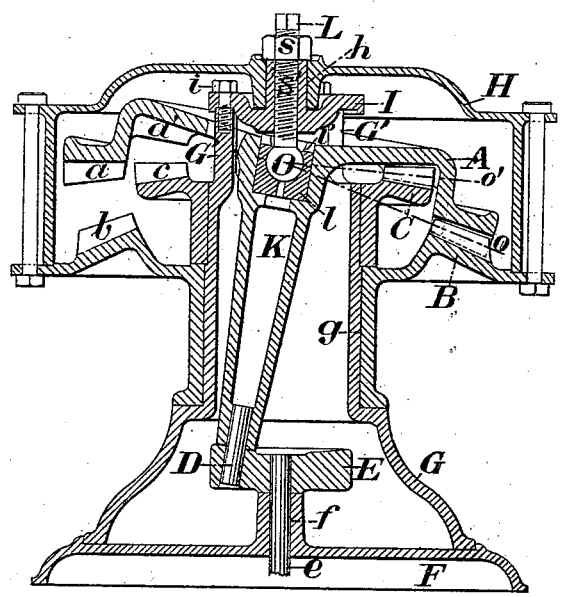
Figure 2:
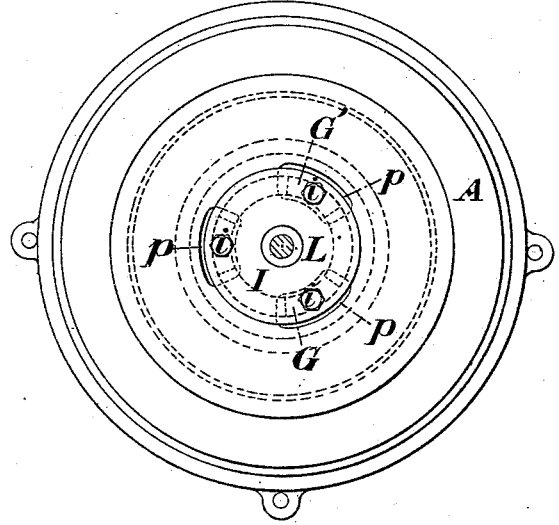

In the accompanying drawings, Figure 1 is a vertical section. Fig. 2 is a plan view of the oscillating gear, the cover H being removed.

Similar letters of reference indicate like parts.

A is the disk oscillating upon the ball O. $l$ and $l'$ form the socket, which is made in two parts. The upper part, $l'$, being threaded, is screwed into the disk. The disk has a stem, K, with a pin, D, on its end, which works into the fly-wheel E, and E revolves on the axle $e$ or with it. Its revolution causes the oscillating motion of the disk A, or the reverse.

The ball O is provided with the threaded stem S', which is screwed into the boss on the plate I and tightened by means of the jam-nut S. By means of this nut and the thread S' the ball O is readily adjusted so as to make the gears work with each other at the right depth. The plate I is fastened by bolts $i\ i\ i$, Fig. 2, to the projecting studs on the stand G, Fig. 1. The studs pass through the openings P P P in the oscillating disk, Fig. 2. The openings are made sufficiently large to allow the free oscillation of the disk.

The stationary gear C, Fig. 1 is rigidly fastened to the stand G, also the plate F, which has the bearing for the axle $e$. The ball O, the gear C, the stand G, and the plate F are all fastened together and become one firmly-united structure, in relation to which the disk A can oscillate around the ball O, being prevented from turning by the gear $a'$ and $c$. The gear-plate B, having the gear $b$, into which works the oscillating gear $a$ on the disk A, has teeth of equal pitch but different in number from the teeth $a$ on the oscillating disk. The cover H is bolted to the gear-plate B and revolves with it upon the bearings $g\ h$.

The operation of the device is as follows: When the stand G is held firmly and power is applied to B, tending to make it revolve, it will result in a pressure on the oscillating gear $a$ at $o$ when the teeth are in contact. The disk A, being supported by the ball O and the gears $a'$ and $c$ along the line O $o'$, the pressure at $o$, not being in line with O $o'$, will tend to turn or tip the disk A around the line O $o'$. This causes pressure at D, causing the revolution of the fly-wheel E and the axle $e$. The revolution of E changes the positions of the lines of contact O $o'$ and O $o$ all around, the action being the same in every position, and thus brings all the teeth in contact for each revolution of E, during which time the disk A has made one oscillation, and the gear B has moved forward as many teeth as there are in the difference between the number of teeth $a$ on the oscillating disk A and the number of teeth $b$ on the gear B. The number of revolutions made by E during one revolution of B is accordingly equal to the number of teeth in B divided by the difference between the number in $a$ and $b$.

It is apparent that instead of making the stand G stationary the gear B can be made stationary and motion communicated to G, giving a corresponding result.

In the accompanying drawings, the gear $a$ on the oscillating disk has a greater number of teeth than $b$ on the gear B; but a corresponding result can be obtained by making a less number of teeth in $a$ than in $b$, which only changes the angles of the gears, bringing the line of contact O $o$ above O $o'$ instead of below. The motion of E will then be reversed.

For special devices required to adapt this differential gear to the purposes of a horse-power, I propose to procure a separate patent, and for that purpose filed my application April 5, 1878.

What I claim is—

1. An oscillating disk having two bevel-gears on one of its faces, a stationary bevel-gear, and a gear turning upon a hollow axle, through which axle an arm from the oscillating disk extends, such arm being used to communicate rotary motion from the oscillations of the disk, all arranged to operate substantially as described.

2. The projecting studs P P P through the oscillating disk, for the purpose of furnishing a support for the plate I, substantially as described.

3. In combination with a system of gearing, as described, the arrangement of the bearings $f$ and $h$ with the plates B and H, so that when the plates B and H are fastened together the bearings $f$ and $h$ will be kept in line, thereby forming in effect a continuous bearing, substantially as and for the purposes specified.

RUFUS DUTTON.

Witnesses:
C. H. EMERSON,
FAYETTE F. BROWN.